United States Patent

[11] 3,561,478

| [72] | Inventor | John F. Taplin |
| | | 15 Sewall St., West Newton, Mass. 02165 |
| [21] | Appl. No. | 581,508 |
| [22] | Filed | Sept. 23, 1966 |
| [45] | Patented | Feb. 9, 1971 |

[54] COMPACT SERVO-CONTROLLED FLUID MIXING VALVE
12 Claims, 5 Drawing Figs.

[52] U.S. Cl. .................................................. 137/625.4, 236/12
[51] Int. Cl. ..................................................F16k 11/02, G05d 23/00
[50] Field of Search............................................ 137/625.4, 625.27; 236/12A; 251/45

[56] References Cited
UNITED STATES PATENTS
| 1,580,481 | 4/1926 | Gavin.......................... | 251/45 |
| 2,550,907 | 5/1951 | Brown.......................... | 236/12A |
| 3,303,854 | 2/1967 | Churchill...................... | 137/625.27X |

FOREIGN PATENTS
| 809,829 | 12/1936 | France ......................... | 251/45 |
| 705,669 | 3/1954 | Great Britain................. | 137/625.27 |

*Primary Examiner*—Henry T. Klinksiek
*Attorney*—Erwin Salzer

ABSTRACT: A servo-controlled dual fluid mixing valve is provided with a fluid motor having a cylinder which is subdivided by a dual function partition into two chambers. This partition is adapted to operate both as a valve element and as the piston of a fluid motor. The dual function partition is provided with two transverse control passageways of which one admits fluid to the cylinder of the fluid motor to cause movement of the piston in one direction, and the other transverse control passageway dumps fluid from the cylinder of the fluid motor to cause movement of the piston—or of a structure operating as a piston—in the opposite direction.

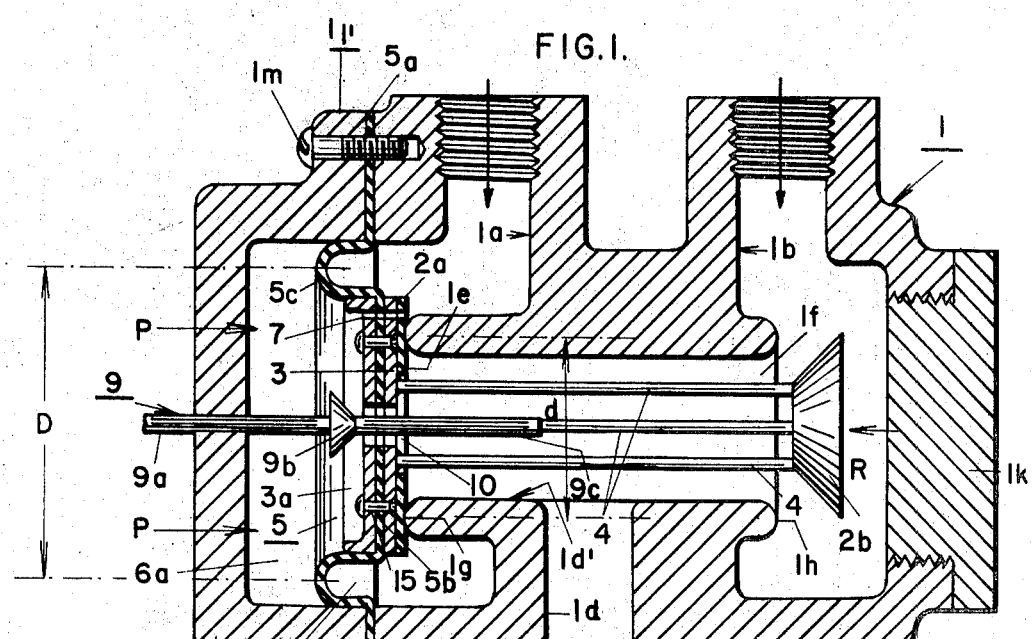
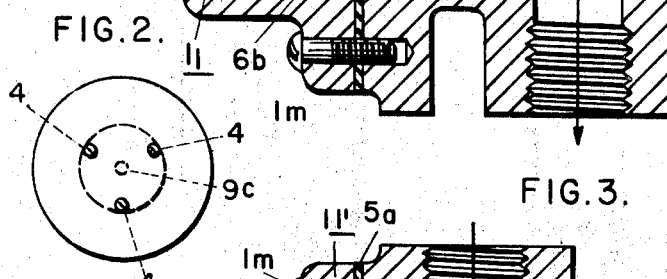
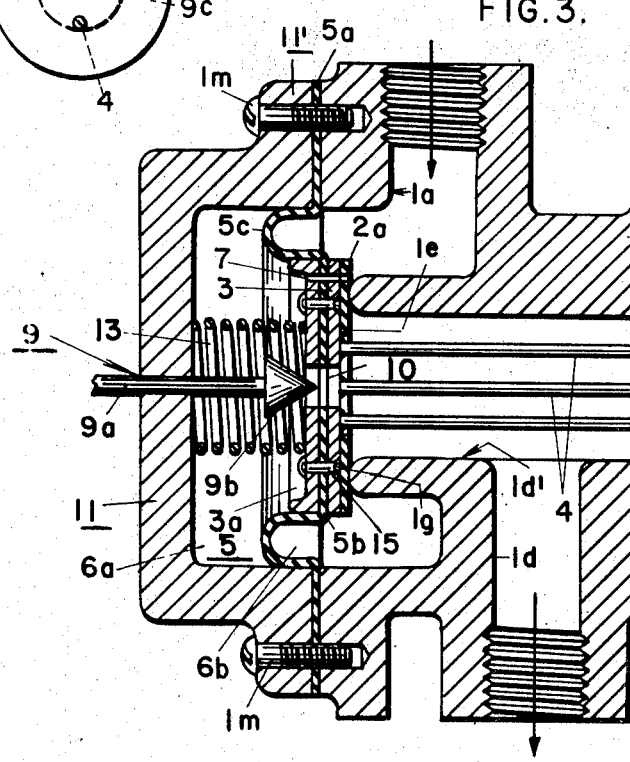

COMPACT SERVO-CONTROLLED FLUID MIXING VALVE

It is a general object of this invention to provide a fluid mixing valve which is servocontrolled for mixing two fluids in a variable ratio determined by the action of any desired sensing element, which is simple and capable of being manufactured at small cost.

It is a more specific object of this invention to provide a servocontrolled mixing valve having a single rolling diaphragm-type structure performing the function of a valve-element-operating motor means and, in addition thereto, the function of a movable valve element.

For a better understanding of the present invention together with other objects thereof, reference may be had to the following description, taken in connection with the accompanying drawings, and its scope will be pointed out with particularity in the appended claims.

Referring now to the drawings:

FIG. 1 is a vertical section of a mixing valve embodying the present invention;

FIG. 2 is an end view of a detail of the structure of FIG. 1, seen in the direction of the arrow R;

FIG. 3 is a vertical section of a slight modification of the structure of FIG. 1;

The ensuing description of the invention refers primarily to the joint features of the structures of FIGS. 1—5, and the differences between these structures will be pointed out at, or near to, the conclusion of this description.

Figure 4:
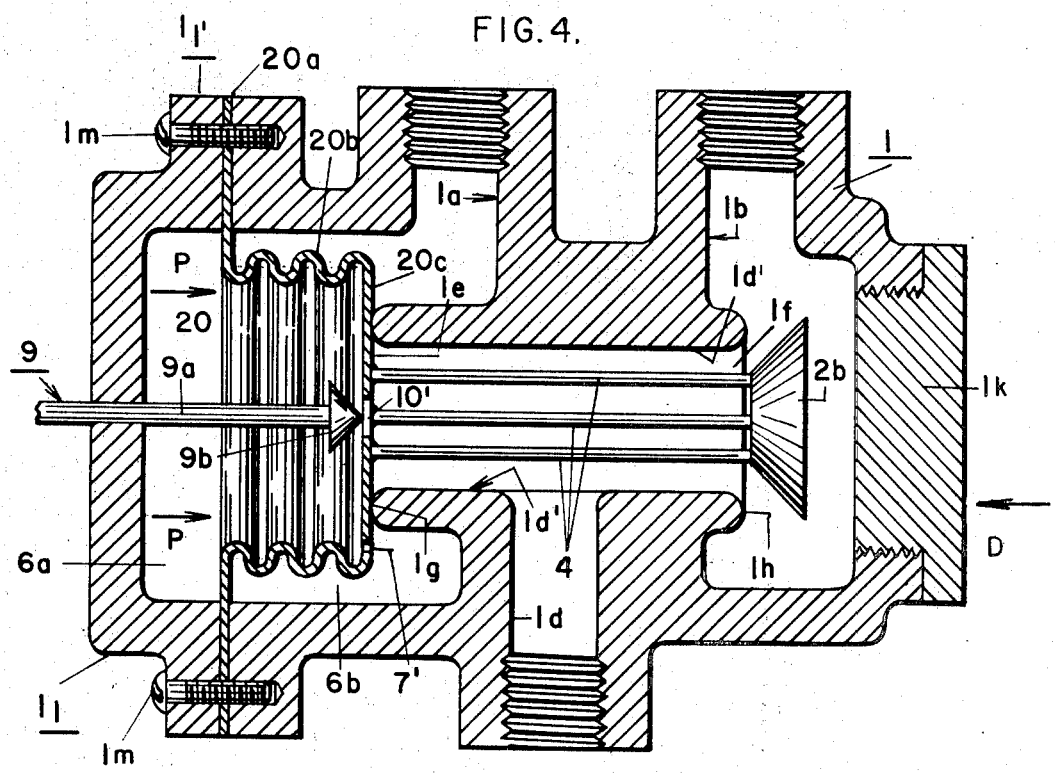
FIG. 4 is a vertical section of a modification of the structure of FIG. 1 involving substitution of a bellows for the rolling diaphragm of FIG. 1.
Figure 5:
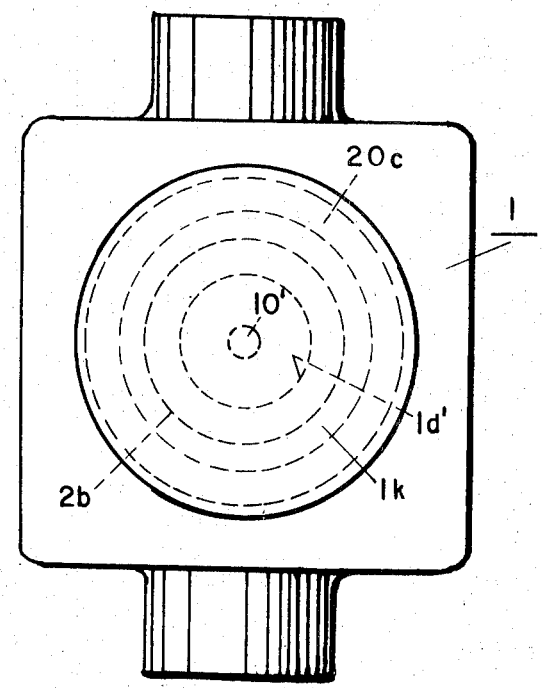
FIG. 5 is a side elevation of the structure of FIG. 4 seen in the direction of arrow D.

The mixing valve structure embodying this invention includes a valve structure, or valve body, generally designated by the reference character 1. Structure 1 defines a pair of fluid-admission passageways $1a$, $1b$ and a fluid-outlet passageway $1d$. Each fluid-admission passageway $1a$, $1b$ has a port $1e$ and $1f$, respectively, to fluid-outlet passageway $1d$. Port $1e$ is bounded by a circular valve seat $1g$, and port $1f$ is bounded by a circular valve seat $1h$. Passageway $1b$ may be referred to as first fluid-admission passageway and passageway $1a$ as second fluid-admission passageway. The right side of the structure of FIGS. 1, 3 and 4 is closed by an externally screw-threaded plug $1k$ cooperating with an internal screw thread on structure 1. The left side of the structures of FIGS. 1, 3 and 4 is closed by a cap $1l$ forming a cylinder. Cap or cylinder $1l$ has a circular flange $1l'$ clamped by means of screws $1m$ against a coextensive juxtaposed flange formed by the central portion of the structure of FIGS. 1, 3 and 4. Valve seat $1g$, or second valve seat, cooperates with a movable valve element $2a$. According to FIGS. 1 and 3 movable valve element $2a$ is in the form of a relatively resilient plate supported and backed by metal plate 3. Valve seat $1h$, or first valve seat, cooperates with a movable valve element $2b$ which is substantially in the shape of a frustum of a cone. Plate 3 and valve element $2b$ are tied together by tie means formed by three parallel rods 4 which are angularly displaced $360/3° = 120°$. Movable valve element means $2a$, $2b$ control the effective areas of ports $1e$, $1f$. In the position shown in FIGS. 1 and 3 the port $1e$ is entirely closed by valve element $2a$ and its backing plate 3. Valve element $2b$ is shown in its right limit position, in which the effective area of port $1f$ is largest, and the spacing between valve seat $1h$ and cone or valve element $2b$ is largest. If parts $2a$, 3, 4 and $2b$ are moved from right to left, the effective area of port $1e$ is progressively increased, and the effective area of port $1f$ progressively decreased. Speaking more generally, the movement of parts $2a$, 3, 4 and $2b$ changes inversely the effective areas of ports $1e$ and $1f$. Valve element means $2a$, 3, 4 and $2b$ are jointly operable by a common fluid-motor means. Said fluid-motor means includes the above referred-to cylinder $1l$ and a single rolling diaphragm generally indicated at 5. Rolling diaphragm 5 includes a radially outer flange portion $5a$, a radially inner circular portion $5b$ and a substantially U-shaped rolling wall $5c$. Rolling diaphragm 5 is a partition means which subdivides cylinder $1l$ into an axially outer or second chamber $6a$ and an axially inner or first chamber $6b$. Chamber $6b$ communicates directly with fluid-admission passageway $1a$ and, therefore, the same pressure prevails always in chamber $6b$ as in fluid-admission passageway $1a$. Chamber $6a$ communicates through a restricted duct or first control passageway with first chamber $6b$, and fluid-admission duct $1a$. The radially inner circular portion $5b$ of rolling diaphragm 5 is sandwiched between the aforementioned metal plate or center plate 3 and a metal plate $3a$. In other words, parts $3a$, $5b$, 3 and $2a$ form a multiple sandwich which is integrated into a unitary structure by fasteners projecting transversely through said multiple sandwich as, for instance, rivets 15. This sandwich or plate means forms a planar center portion of the partition subdividing cylinder $1l$ into chambers $6a$, $6b$. The aforementioned restricted duct 7 extends transversely through all the constituent layers $3a$, $5b$, 3 and $2a$ of the aforementioned multiple sandwich. Plate means $3a$, $5b$, 3 and $2a$ further define a tubular fluid releasing passage 10 for releasing fluid under pressure from chamber, or servochamber, $6a$ of cylinder $1l$ to an area of relatively lower pressure as, for instance, the fluid-outlet passageway $1d$. Reference numeral 9 has been applied to generally indicate a servovalve. This valve controls by its position the effective area of fluid releasing passage 10. Servovalve 9 includes a servovalve stem $9a$ and a servovalve element $9b$ which is substantially cone shaped. Stem $9a$ is slidably supported by bearing means integral with the end surface of cylinder $1l$. Such bearing means may be formed by a simple bore in the end surface of cylinder $1l$, or may take the form of a more elaborate slide bearing to minimize friction when stem $9a$ of servovalve 9 is moved back and forth in a direction longitudinally thereof in response to the adjustment of a sensing element (not shown) as, for instance, the adjustments of a bimetallic metal thermometer, or a Bourdon tube, arranged somewhere inside of fluid-outlet passageway $1d$, or a continuation thereof serially related to it.

Stem $9a$ may be operated in response to any mechanical sensor, or in response to any other sensor converting its signals by means of a transducer into corresponding movements of stem $9a$ in a direction longitudinally thereof and corresponding movements of valve element $9b$. The structure of FIG. 1 is particularly intended for use in connection with sensing elements or sensors (not shown) which are arranged in the fluid-outlet passageway $1d$. As shown in FIGS. 1 and 2, stem $9a$ of servovalve element $9b$ has an end $9c$ projecting transversely through fluid releasing passage 10. Part $9c$ may readily be tied to, or operatively related to, any sensing element arranged inside of fluid-outlet passageway $1d$ for controlling the positions of valve element $9c$ relative to fluid releasing passage 10.

The multiple plate sandwich $2a$, 3, $5b$, $3a$ should be biased for reasons explained below more in detail in a direction from left to right. This bias may be achieved by various biasing means as, for instance, springs, diagrammatically indicated in FIG. 1 by a pair of arrows to which reference character P has been applied.

In the preferred embodiment of the invention shown in FIG. 3 the multiple sandwich $2a$, 3, $5b$, $3a$ is biased from left to right by helical spring 13. One end of spring 13 abuts against plate sandwich $2a$, 3, $5b$, $3a$, and the other end of spring 13 abuts against the end surface of cylinder $1l$ remote from valve element $9b$. Valve element $9b$, its stem $9a$, spring 13 and cylinder $1l$ are arranged in coaxial relation.

Fluid-outlet passageway $1d$ is substantially T-shaped. Reference character $1d'$ has been applied to indicate the horizontal portion of fluid-outlet passageway $1d$ having a geometrical axis at right angle to the multiple plate sandwich $2a$, 3, $5b$, $3a$. Supporting rods 4 for valve element $2b$ extend parallel to the axis of the aforementioned horizontal portion $1d'$ of passage $1d$.

Reference character $d$ has been applied to indicate the diameter of valve seat $1g$ and reference character $D$ has been applied to indicate the effective diameter of rolling diaphragm 5. If the supply pressure in fluid-admission passageway 1a and cylinder chamber 6b is P, then sandwich 2a, 3, 5b, 3a is subjected to a force from right to left which is $$F_1 = P\left(\frac{\pi \cdot D^2}{4} - \frac{\pi d^2}{4}\right) = \frac{\pi P}{4}(D^2 - d^2) \quad (1)$$

The sandwich 2a, 3, 5b, 3a is further subjected to a force from left to right $$F_2 = P_s \cdot \frac{\pi D^2}{4} \quad (2)$$

wherein $P_s$ is the pressure prevailing in chamber, or servochamber, 6a. If $P'$ is the pressure of fluid supplied to fluid-admission passageway 1b, valve element 2b will be subject to a thrust $F_3$ from right to left proportional to $P'$, or $$F_3 \sim P' \quad (3)$$

The left-to-right bias of sandwich 2a, 3, 5b, subjected a by spring 13, or equivalent means, is intended to counterbalance in part the right-to-left thrust $F_3$.

The sandwich 2a, 3, 5b, 3 is further subjected to a force $F_4$ likewise determining its position. That force depends upon the specific pressure prevailing in the horizontal portion 1d' of outlet passageway 1d and the cross-sectional area thereof.

Sandwich 2a, 3, 5b, 3 is at rest when the sum of the forces acting upon it is zero. The position of sandwich 2a, 3, 5b, 3 can be controlled by servovalve 9, i.e., by changing the effective cross-sectional area of fluid releasing passage 10.

It will be understood that any movement of servovalve element 9b from right to left will result in a decrease of the servopressure $P_s$ in servochamber 6a, tending to move sandwich 2a, 3, 5b, 3a from right to left, and to thus increase the effective area of fluid-admission port 1e. On the other hand, any movement of servovalve element 9b from left to right will result in an increase of the servopressure $P_s$ in servochamber 6a, tending to move sandwich 2a, 3, 5b, 3a from left to right, and thus to decrease the effective area of fluid-admission port 1e and to increase simultaneously the effective area of fluid-admission port 1f.

FIGS. 1 and 3 show sandwich 2a, 3, 5b, 3 a in one of its limit positions wherein the effective area of port 1e is zero, and the effective area of port 1f is at its maximal value.

Referring now to FIG. 4, the same reference characters have been applied to indicate like parts in that FIG. as in FIGS. 1—3. FIG. 4 is, therefore, self-explanatory inasmuch as the structure shown therein is identical to the structure of FIGS. 1—3 and inasmuch as the same reference characters have been applied to indicate like parts.

The structure of FIG. 4 differs significantly from that of FIGS. 1—3 in that a bellow 20 has been substituted for the rolling diaphragm 5 of FIGS. 1—3. Bellows 20 subdivides cylinder 1l into an axially outer chamber 6a and an axially inner chamber 6b. Chamber 6b communicates directly with fluid-admission passageway 1a. Bellows 20 includes a radially outer flange 20a, a corrugated portion 20b arranged in coaxial relation to horizontal portion 1d' of outlet passageway 1d, and an end surface 20c. End surface 20c forms a movable valve element cooperating with fixed valve seat 1g. If desired, the end surface 20c of bellows 20 may be covered with a coextensive outer layer (not shown) of a material to improve its ability to operate as a movable valve element. Such a layer may be cemented to the outside of the end surface 20c of bellows 20. End surface 20c is provided with a restricted passage 7' extending transversely through end surface 20c and establishing a communication between fluid-admission passageway 1a and chamber 6b, on the one hand, and chamber 6a, on the other hand. The end surface 20c of bellows 20 further defines a fluid releasing passage 10' for releasing fluid under pressure from servochamber 6a of cylinder 1l to an area of relatively lower pressure, e.g., the horizontal portion 1d' of fluid-outlet passageway 1d. The effective area of the fluid releasing passage is controlled by servovalve 9 including movable cone-shaped valve element 9b supported by stem 9a.

The arrows P of FIG. 4 indicate diagrammatically a means for biasing end surface 20c from left to right. This may be achieved by a helical spring arranged in the same fashion as helical spring 13 of FIG. 3.

Movement of servovalve element 9b from right to left results in a reduction of the pressure in chamber 6a, tending to move end surface 20c from right to left, and to thus increase the effective area of fluid-admission port 1e, and to simultaneously decrease the effective area of fluid-admission port 1f. Movement of valve element 9b from left to right increases the pressure in chamber 6a, tending to move the end surface 20c of bellows 20 from left to right, and to decrease the effective area of fluid-admission port 1e, increasing the effective area of fluid-admission port 1f. The movement of end surface 20c from left to right results ultimately in the physical engagement of end surface 20c and valve seat 1g, thus reducing to zero the effective area of port 1e, and maximizing the effective area of port 1f.

It will be noted that the restricted passageway 7 of FIGS. 1 and 3 is arranged off center of the circular multiple plate sandwich 2a, 3, 5b, 3a, and that the restricted passageway 7' of FIG. 4 is arranged off center of the end surface 20c of bellows 20. The fluid releasing passage 10 of FIGS. 1 and 3 for venting chamber 6a is arranged in the center of multiple plate sandwich 2a, 3, 5b, 3a, and the fluid releasing passage 10' of FIG. 4 for venting chamber 6a is arranged in the center of end surface 20c of bellows 20.

It will be apparent from the above that the several embodiments of the invention are provided with fluid motor means which include a cylinder and a movable partition subdividing the cylinder into two separate chambers 6a, 6b of which the latter chamber 6b communicates directly with fluid-admission passageway 1a. The aforementioned partition includes a substantially planar disc-shaped center portion formed by one or more plates, and a peripheral flexible portion. In the embodiment of the invention shown in FIGS. 1 to 3 the peripheral flexible portion of the partition is formed by a rolling diaphragm, and in the embodiment of the invention shown in FIGS. 4 and 5 the peripheral flexible portion of the partition is formed by the corrugated portion of a bellows. The substantially planar disc-shaped center portion of the above referred-to partition is juxtaposed to the valve seat 1g formed by a surface of port 1e for controlling the effective area of port 1e. Thus the substantially planar disc-shaped center portion of the cylinder-subdividing partition performs the dual function of operating as a movable valve element and of operating a pistonlike element of a fluid motor. A pair of control passageways 7, 10 extend transversely through the cylinder-subdividing partition of which one connects fluid-admission passageway 1a to chamber 6a, and the other connects chamber 6a to fluid-outlet passageway 1d. The effective area of the latter control passageway is controlled by servovalve element 9b supported by stem 9a, 9c. Tie means 4 move valve element 2b positively in either direction, thus precluding any relative movement between valve element 2b and the planar disc-shaped center portion of the cylinder-subdividing partition which forms a second valve element by cooperating with valve seat 1g to change the effective area of port 1e. In other words, tie means 4 integrate the center portion of the cylinder-subdividing partition and valve element 2b to form a unitary structure.

I claim:

1. A servocontrolled dual fluid mixing valve for mixing two fluids in accordance with a variable ratio determined by the action of a sensing element including:
    a. a valve structure (1) defining a first and a second fluid-admission passageway (1b, 1a) and a fluid-outlet passageway (1a), said first fluid-admission passageway (1b) having a port (1f) to said fluid-outlet passageway (1d) including a surface forming a first valve seat (1h) and said second fluid admission passageway (1a) having a port (1a) to said fluid-outlet passageway (1d) including a surface forming a second valve seat (1g);

b. a movable valve element (2b) juxtaposed to and cooperating with said first valve seat (1h) for controlling the effective area of said port (1f) of said first fluid-admission passageway (1b);

c. fluid motor means (1l, 5,3,3a) including a cylinder (1 1) and partition means (5, 3, 3a) subdividing said cylinder (1l) into a first chamber (6b) adjacent said second fluid-admission passageway (1a) communicating directly with said second fluid-admission passageway (1a) and a second chamber (6a) remote from said second fluid-admission passageway (1a) and communicating through a restricted duct (7) defined by said partition means (5, 3, 3a) with said second fluid-admission passageway (1a), a portion (3, 3a) of said partition means (5, 3, 3a) being juxtaposed to and cooperating with said second valve seat (1g) for controlling the effective area of said port (1f) of said second fluid-admission passageway (1a);

d. tie means (4) interconnecting said movable valve element (2b) and said portion (3, 3a) of said partition means (5, 3, 3a) integrating said movable valve element (2b) and said portion (3, 3a) of said partition means (5, 3, 3a) into a unitary structure and precluding any relative movement of said movable valve element (2b) and said portion (3, 3a) of said partition means (5, 3, 3a) whereby the effective area of said port (1f) of said first fluid admission passageway (1b) and the effective area of said port (1e) of said second fluid-admission passageway (1a) are inversely changed upon joint movement of said valve element 2b and said partition means (5, 3, 3a);

e. a fluid-releasing passage (10) defined by said partition means (5, 3, 3a) for releasing fluid under pressure from said second chamber (6a) of said cylinder (1l) to an area of relatively lower pressure; and f. a sensor controlled servovalve element (9b) controlling the effective area of said fluid-releasing passage (10).

2. A servocontrolled dual fluid mixing valve as specified in claim 1 wherein said partition means (5, 3, 3a) includes a single rolling diaphragm (5) having a radially outer portion (5a), a rolling wall (5c) and a radially inner portion (5b), and wherein a plate means (3, 3a) substantially coextensive with said radially inner portion (5b) of said rolling diaphragm (5) is fixedly secured to said radially inner portion (5b) of said rolling diaphragm (5), said plate means (3, 3a) defining a restricted duct (7) at a point radially spaced from the center of said plate means (3, 3a), and said plate means (3, 3a) defining said fluid-releasing passage (10) at the center of said plate means (3, 3a).

3. A servocontrolled dual fluid mixing valve as specified in claim 2 wherein said plate means (3, 3a) sandwiches said radially inner portion (5b) of said rolling diaphragm (5).

4. A servocontrolled dual fluid mixing valve as specified in claim 1 wherein said partition means includes a substantially hat-shaped bellows (20) having a radially outer clamping flange (20a), a corrugated lateral wall (20b) and an end surface (20c) adjacent the end of said wall (20b) remote from said clamping flange (20a), said end surface (20c) defining said restricted duct (7') at a point radially spaced from the center of said end surface (20c) and said end surface (20c) defining said fluid-releasing passage (10') at the center of said end surface (20c).

5. A servocontrolled dual fluid mixing valve as specified in claim 1 wherein said first chamber (6b) of said cylinder (1l) houses spring means (13) biasing said portion (3, 3a) of said partition means (5, 3, 3a) into engagement with said second valve seat (1g).

6. A servocontrolled dual fluid mixing valve as specified in claim 1 wherein said servovalve element (9b) is supported by a valve stem (9a) arranged in coaxial relation to and slidably supported by said cylinder (1l) and wherein said second chamber (6a) houses a helical biasing spring (13) one end of which abuts against said portion (3, 3a) of said partition means (5, 3, 3a) and the other end of which abuts against an end surface of said cylinder (1l)

7. A servocontrolled dual fluid mixing valve as specified in claim 1 wherein said portion (3, 3,a) of said partition means (5, 3, 3a) and said movable valve element (2b) are tied together by a plurality of parallel spaced rods (4).

8. A servocontrolled dual fluid mixing valve as specified in claim 1 wherein said releasing passage (10) communicates with said fluid-outlet passageway (1d).

9. A servocontrolled dual fluid mixing valve as specified in claim 1 wherein said servovalve element (9b) is operable by a stem (9a) slidably supported by a bearing means integral with an end surface of said cylinder (1l).

10. A servocontrolled dual fluid mixing valve as specified in claim 9 wherein said stem (9a) of said servovalve element (9b) has an end projecting through said fluid-releasing passage (10) into said fluid-outlet passageway (1d).

11. A servocontrolled dual fluid mixing valve for mixing two fluids in accordance with a variable ratio determined by the action of a sensing element including:

a. a valve structure (1) defining a first and a second fluid-admission passageway (1b,1a) and a fluid-outlet passageway (1d), said first fluid-admission passageway (1b) having a port to said fluid-outlet passageway (1d) including a surface forming a first valve seat (1h) and said second fluid-admission passageway (1a) having a port (1e) to said fluid-outlet passageway (1d) including a surface forming a second valve seat (1g);

b. a movable valve element (2b) juxtaposed to and cooperating with said first valve seat (1h) for controlling the effective area of said port (1f) of said first fluid-admission passageway (1b);

c. fluid motor means (5, 3, 3a) including a cylinder (1l) and a partition (5, 3, 3a) subdividing said cylinder (1l) into a first chamber (6b) adjacent said second fluid-admission passageway (1a) and communicating directly with said second fluid-admission passageway (1a), said partition (5, 3, 3a) including a substantially planar center portion 3, 3a) and a peripheral flexible portion (5c), said substantially planar center portion (3, 3a) being juxtaposed to and cooperating with said second valve seat (1g) for controlling the effective area of said port (1f) of said first fluid-admission passageway (1b), said partition (5, 3, 3a) defining a pair of control passageways (7, 10), one (7) of said pair of control passageways (7, 10) connecting said second chamber (6a) to said second fluid-admission passageway (1a), and the other of said pair of control passageways (10) connecting said second chamber (6a) to said fluid-outlet passageway (1d);

d. a movable sensor controlled servovalve element (9b) for varying the effective area of one (10) of said pair of control passageways (7, 10) in accordance with a variable operating condition; and e. tie means (4) integrating said movable valve element (2b) and said planar center portion (3, 3a) of said partition (5, 3, 3a) into a unitary structure.

12. A servocontrolled dual fluid mixing valve for mixing two fluids in accordance with a variable ratio determined by the action of a sensing element including:

a. a valve structure (1) defining a first and a second fluid-admission passageway (1b,1a) and a fluid-outlet passageway (1d) said first fluid-admission passageway (1b) having a port (1f) to said fluid-outlet passageway (1d) including a surface forming a first valve seat (1h) and said second fluid-admission passageway (1a) having a port (1e) to said fluid-outlet passageway (1d) including a surface forming a second valve seat (1g);

b. a movable valve element (2b) juxtaposed to and cooperating with said first valve seat (1h) for controlling the effective area of said port (1f) of said first fluid-admission passageway (1b);

c. fluid motor means (1l), 5, 3, 3a) including a cylinder (1l) and a partition (5, 3, 3a) subdividing said cylinder (1l)

into a first chamber (6b) and a second chamber (6a), said first chamber (6b) communicating directly with said second fluid-admission passageway (1a), said partition (5, 3, 3a) including a substantially disc-shaped center plate (3) and a peripheral flexible portion (5c), said center plate (3) being juxtaposed to said second valve seat (1g) and cooperating with said second valve seat to control the effective area of said port (1d) of said second fluid-admission passageway (1a), said center plate (3) defining a first control passageway (7) connecting said second chamber (6b) to said second fluid-admission passageway (1a), and said center plate (3) defining a second control passageway (10) coaxial with said cylinder (1l) connecting said second chamber (6a) to said fluid-outlet passageway (1d);

d. a servovalve element (9b) for varying the effective area of said second control passageway (10);

e. a servovalve stem (9a) arranged in said second chamber (6b) in coaxial relation to said cylinder (1l) supporting said servovalve element (9b);

f. spring means (13) arranged in said second chamber (6a) biasing said center plate (3) into engagement with said second valve seat (1g); and g. tie means (4) joining said movable valve element (2b) to said center plate (3).